US008015551B2

(12) United States Patent
Kinno et al.

(10) Patent No.: US 8,015,551 B2
(45) Date of Patent: Sep. 6, 2011

(54) SOFTWARE OPERATION MODELING DEVICE, SOFTWARE OPERATION MONITORING DEVICE, SOFTWARE OPERATION MODELING METHOD, AND SOFTWARE OPERATION MONITORING METHOD

(75) Inventors: Akira Kinno, Yokahama (JP); Takehiro Nakayama, Yokohama (JP)

(73) Assignee: NTT DoCoMo, Inc., Toyko (JP)

( * ) Notice: Subject to any disclaimer, the term of this patent is extended or adjusted under 35 U.S.C. 154(b) by 1294 days.

(21) Appl. No.: 11/563,449

(22) Filed: Nov. 27, 2006

(65) Prior Publication Data
US 2007/0204257 A1    Aug. 30, 2007

(30) Foreign Application Priority Data
Nov. 28, 2005  (JP) ................ P2005-342717

(51) Int. Cl.
*G06F 9/44*   (2006.01)
(52) U.S. Cl. ........ 717/127; 717/128; 717/130; 717/139; 717/157
(58) Field of Classification Search .......... None
See application file for complete search history.

(56) References Cited

U.S. PATENT DOCUMENTS

| | | | | | |
|---|---|---|---|---|---|
| 4,525,780 | A | * | 6/1985 | Bratt et al. ............. | 711/163 |
| 5,603,031 | A | * | 2/1997 | White et al. ............. | 719/317 |
| 5,628,016 | A | * | 5/1997 | Kukol ..................... | 717/140 |
| 5,764,985 | A | * | 6/1998 | Smale ..................... | 719/328 |
| 5,953,529 | A | * | 9/1999 | Kato ....................... | 717/135 |
| 5,958,004 | A | * | 9/1999 | Helland et al. ......... | 718/101 |
| 5,978,586 | A | * | 11/1999 | Baisley et al. ......... | 717/158 |
| 5,978,587 | A | * | 11/1999 | Baisley et al. ......... | 717/144 |
| 6,230,312 | B1 | * | 5/2001 | Hunt ....................... | 717/108 |
| 6,301,601 | B1 | * | 10/2001 | Helland et al. ......... | 718/101 |
| 7,496,908 | B2 | * | 2/2009 | DeWitt et al. ......... | 717/158 |
| 7,526,757 | B2 | * | 4/2009 | Levine et al. ......... | 717/130 |
| 7,533,371 | B1 | * | 5/2009 | Johns et al. ............. | 717/130 |
| 2002/0032822 | A1 | * | 3/2002 | Plummer et al. ...... | 710/260 |
| 2002/0040470 | A1 | * | 4/2002 | Guthrie et al. ......... | 717/126 |
| 2002/0112227 | A1 | * | 8/2002 | Kramskoy et al. ..... | 717/148 |
| 2003/0135844 | A1 | * | 7/2003 | Yellin et al. ............ | 717/126 |
| 2004/0205474 | A1 | | 10/2004 | Eskin et al. | |

(Continued)

FOREIGN PATENT DOCUMENTS

JP    2004-126854    4/2004

(Continued)

OTHER PUBLICATIONS

Title: Dynamic learning of automata from the call stack log for anomaly detection, author:Zhen Liu et al, source: IEEE, dated: May 16, 2005.*

(Continued)

*Primary Examiner* — Chameli C Das
(74) *Attorney, Agent, or Firm* — Oblon, Spivak, McClelland, Maier & Neustadt, L.L.P.

(57) ABSTRACT

The software operation modeling device includes a function call order obtaining unit and a model generator. The function call order obtaining unit obtains or estimates an issuing order of function calls executed in each of specific events in the course of executing software. The model generator statistically grasps a co-occurrence relationship between the specific event and the issuing order of the function calls obtained or estimated by the function call order obtaining unit, and to record the grasped co-occurrence relationship as an operation model of the software.

16 Claims, 13 Drawing Sheets

U.S. PATENT DOCUMENTS

| | | | | |
|---|---|---|---|---|
| 2005/0278516 | A1* | 12/2005 | Ukai et al. | 712/238 |
| 2006/0198321 | A1* | 9/2006 | Nadeau et al. | 370/254 |
| 2007/0043861 | A1* | 2/2007 | Baron et al. | 709/224 |
| 2007/0277021 | A1* | 11/2007 | O'Connor et al. | 712/208 |
| 2008/0148241 | A1* | 6/2008 | Jones et al. | 717/130 |

FOREIGN PATENT DOCUMENTS

| | | |
|---|---|---|
| JP | 2004-287810 | 10/2004 |

OTHER PUBLICATIONS

Title: Schedulability and performance analysis of the similarity stack protocol, author: Tei-Wei Kuo et al, source: IEEE, dated:May 7, 2003.*

Jian-Jun Zhang, et al., "An Efficient Mining Algorithm for Dependent Patterns", Proceedings of the Third International Conference on Machine Learning and Cybernetics, vol. 1, XP-010760326, Aug. 26, 2004, pp. 80-82.

Jiawei Han, et al., "Mining Frequent Patterns without Candidate Generation", Proceedings of the 2000 ACM SIGMOD International Conference on Management of Data, vol. 29, No. 2, XP-002581402, Jun. 2000, pp. 1-12.

Tian-rui Li, et al., "Intrusion Detection System Based on New Association Rule Mining Model", Granular Computing, 2005 IEEE International Conference on Beijing, China, vol. 2, XP-010886082, Jul. 25, 2005, pp. 512-515.

Kingsly Leung, et al., "Unsupervised Anomaly Detection in Network Intrusion Detection Using Clusters", Proceedings of the Twenty-Eighth Australasian Conference on Computer Science (ACSC2005), vol. 38, XP-002581403, Jan. 2005, pp. 333-342.

Haro d S. Javitz, et al., "The SRI IDES Statistical Anomaly Detector", Proceedings of the Symposium on Research in Security and Privacy, vol. SYMP. 12, XP-010024232, May 20, 1991, pp. 316-326.

Henry Hanping Feng, et al., "Anomaly Detection Using Call Stack Information", The Proceedings of IEEE Symposium on Security and Privacy, May 2003, 14 pages.

Office Action issued Oct. 26, 2010 in JP Application No. 2005-342717 (With English Translation).

Hirotake Abe, et al., "Optimization of Intrusion Detection System Based on Static Analyses", Information Processing Society of Japan Journal, vol. 45, No. 3. Mar. 15, 2004, pp. 11-15 (With English Translation).

Kohei Tatara, et al., "The Design and Evaluation of Anomaly Detection System Based on System Call", Information Processing Society of Japan Journal, vol. 46, No. 8, Aug. 15, 2005, pp. 1967-1970 (With English Translation).

Japanese Office Action with English translation issued on Jan. 25, 2011 in counterpart Japanese Patent Application 2005-342717.

Wenke Lee, Salvatore J. Stolfo, "Data Mining Approaches for Intrusion Detection," Proceedings of the 7$^{th}$ USENIX Security Symposium, U.S.A., USENIX Association, Jan. 26, 1998, vol. 7, URL http://www.usenix.org/publications/library/proceedings/sec98/lee.html.

* cited by examiner

FIG. 4
| 122 | 0x80000001 0x80000123 0x80000345 |
| 4 | 0x80000001 0x80000123 0x80000456 0x80000567 |
| 4 | 0x80000001 0x80000321 0x80000654 |
⋮
FIG. 5
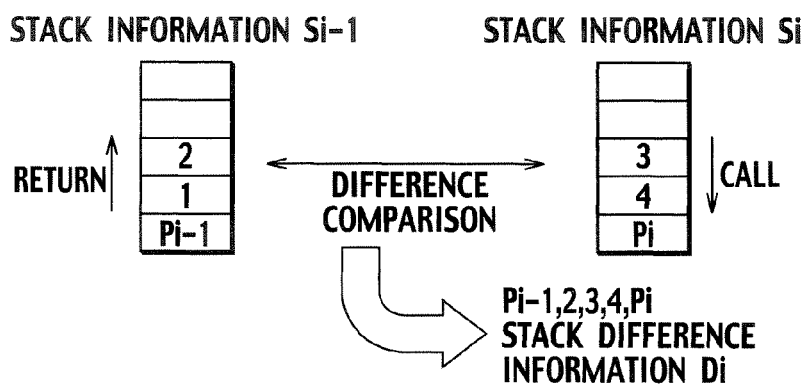
FIG. 6
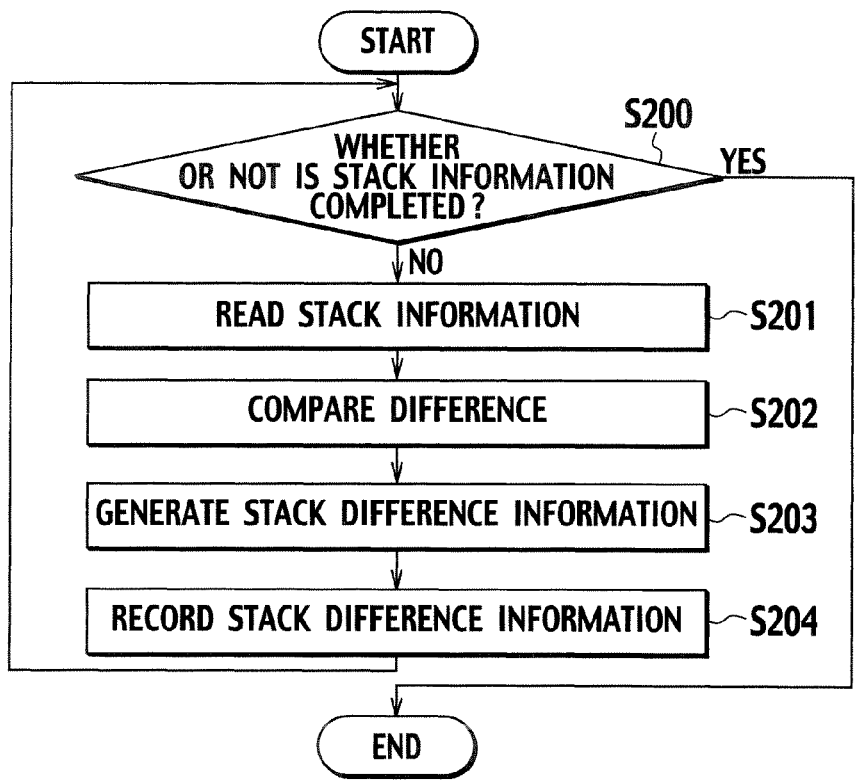

FIG. 7

| 122 | 0x80000001 0x80000123 0x80000345 |
| 4 | 0x80000345 0x80000456 0x80000567 |
| 4 | 0x80000567 0x80000456 0x80000123 0x80000321 0x80000654 |

FP-TREE STRUCTURE

FIG. 10

SECOND ROW= 0x80000456 → 4   100%

•
•
•

ER3: STACK DIFFERENCE ERROR
ER4: CORRELATION RULE ERROR

SOFTWARE OPERATION MODELING DEVICE, SOFTWARE OPERATION MONITORING DEVICE, SOFTWARE OPERATION MODELING METHOD, AND SOFTWARE OPERATION MONITORING METHOD

CROSS REFERENCE TO RELATED APPLICATIONS

This application is based upon and claims the benefit of priority from prior Japanese Patent Application P2005-342717 filed on Nov. 28, 2005; the entire contents of which are incorporated by reference herein.

BACKGROUND OF THE INVENTION

1. Field of the Invention

The present invention relates to a software operation modeling device, a software operation monitoring device, a software operation modeling method, and a software operation monitoring method.

2. Description of the Related Art

All computing machines including personal computers (PCs), workstations, servers, routers, cellular telephones, personal digital assistances (PDAs) are exposed to attacks from outside and from within. A typical attack takes advantage of vulnerability of software executed by the computing machines. An attacker sends a malicious code to a computing machine by exploiting the software vulnerability to seize control of a process in execution, and carries out an unauthorized operation while making use of an authority for that process.

An anomaly detecting system which models a normal operation of a program, and which determines presence or absence of a deviation from the model in the course of executing the program, has been provided for detecting attacks taking advantage of the vulnerability, and particularly for detecting unknown attacks. A system call is a command issued when the process requests a kernel for an important task in the system. The attacker causes the system to execute an arbitrary action by use of the system call as if it is requested by the process. For this reason, validity of the system call is verified at the time of monitoring the operation of the program.

As a method of verifying a validity of a system call during execution of a program, for example, there has been disclosed an anti-attack device including a system call table, a validity inspection functioning unit, an anti-attack functioning unit and a system call. The device checks whether a function requesting a system call is in code area or not. When it is not in the area, the device decides that the request is abnormal. The system call table inputs a system call request issued by a program (a task), and outputs a jump address to the validity inspecting functioning unit. The validity inspection functioning unit determines the validity of the system call request by use of a return function address of a system call issuer, the return function address being stored in a specified memory area by an operating system (OS) at the time of issuing the system call request, and outputs a determination result. In a case where presence of an unauthorized system call request is determined, the validity inspection functioning unit rejects the system call request. The anti-attack functioning unit inputs a result of determination on the unauthorized system call, the determination being made by the authority inspection functioning unit, and takes measures. The system call is called out by inputting a result of determination on an authorized system call request, the determination being made by the authority inspection functioning unit, and executes a command (for example, see JPA2004-126854 which is hereinafter referred to as Patent Document 1).

Meanwhile, in order to verify an authority of a system call, there has been disclosed an attack detection system which utilizes a state of a call stack (a return address sequence loaded on a stack) (for example, see H. Feng et al., "Anomaly Detection Using Call Stack Information," The proc. of IEEE Symposium on Security and Privacy 2003, pp. 62 which is hereinafter referred to as Non-patent Document 1). This system is configured to execute a program first in advance, and is configured to learn a model by use of an obtained result. In the course of executing the program, the system obtains a state of a call stack at the time when a system call occurs, and generates a virtual stack list recorded together with a program counter at the time when the system call occurs. Moreover, the system sequentially executes comparative verification from a bottom stack of a state of a call stack targeted for comparison, and thus finds a different return address. Accordingly, the system generates a subsequent return address sequence (a virtual path). A hash table is formed by use of the virtual stack list and the virtual path thus generated, and the table is used as a program model. When verifying the program, the virtual stack list and the virtual path are formed in the course of executing the program. The system then conducts the matching of the list and the path with those of the hash table used as the model. If the virtual stack list and the virtual path match those of the hash table, a system call request is permitted. If not, the system call request is determined as abnormal.

In an OS such as Linux, a system call is usually issued by use of a wrapper function. Since the wrapper function is located in a code area, the function of the system call issuer always exists in the code area. In a case of a Return-to-libc attack representing a typical attack, the attacker induces the OS to return to "libc," and thereby issues an arbitrary system call. Considering this situation, there is an attack undetectable by the anti-attack device disclosed in Patent Document 1 because this device determines the validity of the address of the function of the system call issuer located in the code area. On the other hand, the attack detection system disclosed in Non-patent Document 1 performs verification by use of the return address loaded on the call stack. In this context, it is likely that the system performs more detailed modeling than the anti-attack device as disclosed in Patent Document 1. Accordingly, it is likely that the attack detection system disclosed in Non-patent Document 1 reduces chances of overseeing the attacks as compared to the anti-attack device disclosed in Patent Document 1.

Nevertheless, the attack detection system disclosed in Non-patent Document 1 performs hash matching at the time of verification. For this reason, if the system fails to learn sufficiently at the time of modeling, the system is forced to determine a normal state as an anomaly (false alarm) when an unlearned action occurs at the time of verification. As a result, the incidence of the false alarm may be increased.

Meanwhile, it is important to accelerate processing with limited resources, and to suppress memory usage in order to mount a system for verifying operation on a computing machine such as a cellular telephone with a small processing capacity.

SUMMARY OF THE INVENTION

In view of the foregoing problems, it is an object of the present invention to provide a software operation modeling device, a software operation monitoring device, a software operation modeling method, and a software operation monitoring method, which makes it possible to reduce false alarm while achieving acceleration of processing with limited resources and suppression of memory usage.

A first aspect of the present invention is to provide a software operation modeling device, including: (a) a function call order obtaining unit configured to obtain or estimate an issuing order of function calls executed in each of specific events in the course of executing software, and (b) a model generator configured to statistically grasp a co-occurrence relationship between the specific event and the issuing order of the function calls obtained or estimated by the function call order obtaining unit, and to record the grasped co-occurrence relationship as an operation model of the software.

A second aspect of the present invention is to provide a software operation modeling method, including: (a) obtaining or estimating an issuing order of function calls executed in each of specific events in the course of executing software, and (b) statistically grasping a co-occurrence relationship between the specific event and the obtained or estimated issuing order of the function calls, and recording the grasped co-occurrence relationship as an operation model of the software.

A third aspect of the present invention is to provide a software operation monitoring device, including: (a) an operation model obtaining unit configured to statistically grasp a co-occurrence relationship between each of specific events issued by software which is monitored and an issuing order of function calls executed in the specific event, and to obtain an operation model indicating the grasped co-occurrence relationship, (b) a function call order obtaining unit configured to obtain or estimate the issuing order of the function calls executed by the software in the course of executing the software, and (c) an operation monitoring unit configured to determine a deviation, from the operation model, of the co-occurrence relationship between the specific events and the issuing order of the function calls obtained by the function call order obtaining unit.

A fourth aspect of the present invention is to provide a software operation monitoring method, including: (a) statistically grasping a co-occurrence relationship between each of specific events issued by software of a monitoring target and an issuing order of function calls executed in the specific event, and obtaining an operation model indicating the grasped co-occurrence relationship, (b) obtaining or estimating the issuing order of the function calls executed by the software in the course of executing the software, and (c) determining a deviation, from the operation model, of the co-occurrence relationship between the specific events and the obtained or estimated issuing order of the function calls.

BRIEF DESCRIPTION OF THE DRAWINGS

FIG. 4 is a view showing an example of the stack information according to the first embodiment.

FIG. 5 is a conceptual diagram showing stack difference information according to the first embodiment.

FIG. 6 is a flowchart showing operations of a stack difference information generating unit according to the first embodiment.

FIG. 7 is a view showing an example of the stack difference information according to the first embodiment.

FIG. 8 is a view showing a first example of a list of a correlationship rule according to the first embodiment.

FIG. 10 is a second example of the list of the correlationship rule according to the first embodiment.

DETAILED DESCRIPTION OF THE PREFERRED EMBODIMENTS

Figure 1:
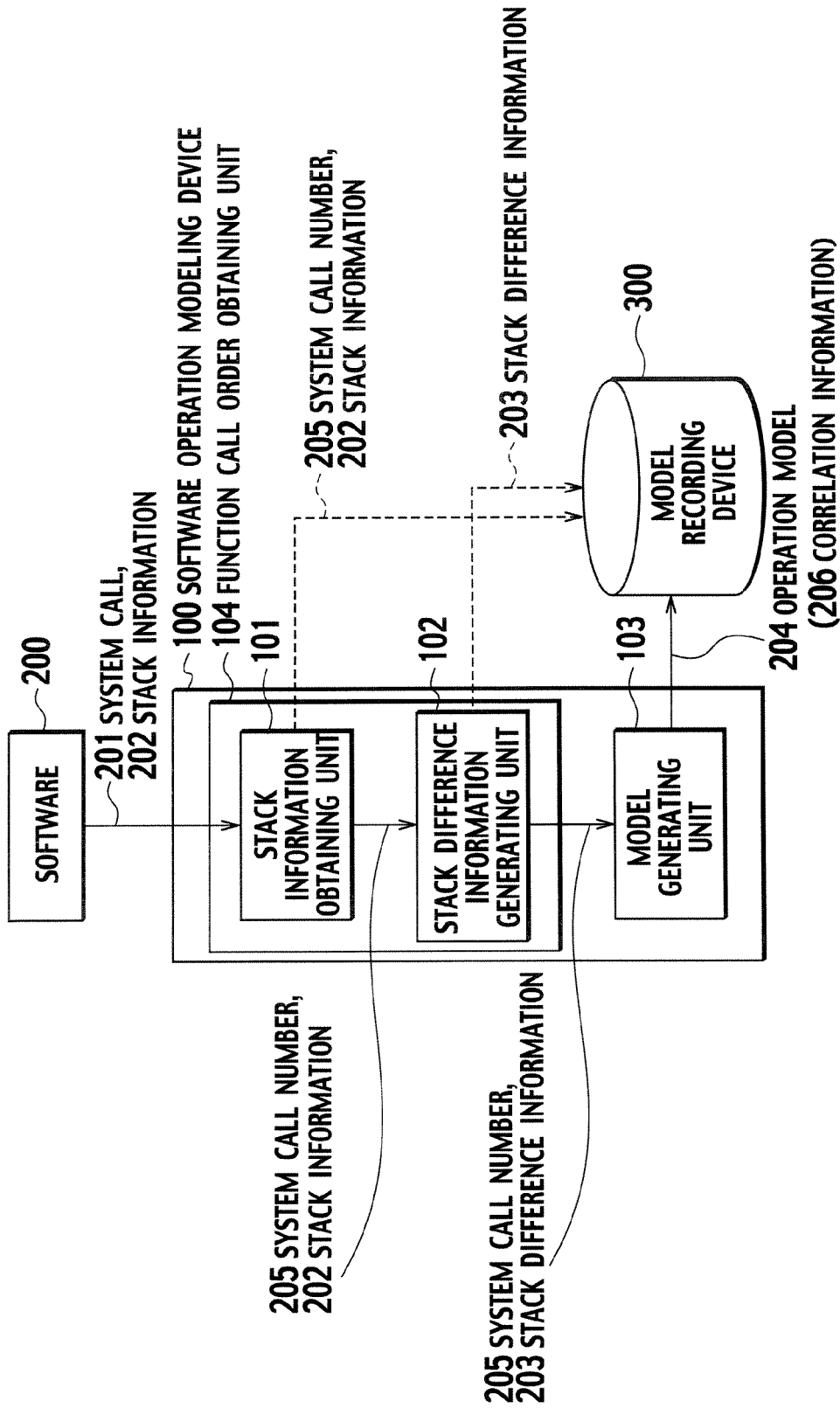
FIG. 1 is a block diagram showing a configuration of a software operation modeling device according to a first embodiment of the present invention.

Now, preferred embodiments of the present invention will be described below with reference to the accompanying drawings. Throughout descriptions of the drawings, identical or similar constituents are respectively designated by identical or similar reference numerals. It is to be noted, however, that the drawings merely represent schematic configurations and concepts of the invention.

First Embodiment (Software Operation Modeling Device and Software Operation Modeling Method)

As shown in FIG. 1, a software operation modeling device 100 according to a first embodiment includes a function call order obtaining unit 104 for grasping an issuing order of function calls executed by software or an arbitrary issuing order of function calls (any of these orders will be hereinafter referred to as an "function call order") executed between specific events (such as system calls) at the time of occurrence of the specific events of the software. The software operation modeling device also includes a model generating unit 103 for generating a co-occurrence relationship between the function call order and the specific events expressed in the form of a statistic amount as an operation model of the software. In addition, the software operation modeling device 100 models operations of software 200, and records an operation model 304 thereof on a model recording device 300.

The function call order obtaining unit 104 includes a stack information obtaining unit 101 and a stack difference information generating unit 102. Incidentally, the configuration of the function call order obtaining unit 104 shown in FIG. 1 is merely an example, and the stack information obtaining unit 101 is not always necessary. In a case where the stack information obtaining unit 101 is not provided, it suffices that a program be operated in a single step, and that the function call be arbitrarily hooked on a function return. In the first embodiment, with this configuration, it is supposed that efficient grasping of the function call order is adopted by means of stopping the program at the time when the specific events occur, instead of operating the program in the single step.

The stack difference information generating unit 102 is not necessary in a case where the stack information obtaining unit 101 is provided. In a case where the stack difference information generating unit 102 is not provided, the software operation modeling device 100 functions as the device configured to grasp the function call order by use of process stack information. Employing the stack difference information generating unit 102 makes it possible to grasp not only the function calls but also the function call order including function returns. Thereby, more detailed operations can be included in the model. Accordingly, it is supposed that the first embodiment adopts this configuration.

At the time when a specific event (such as a system call 201) occurs in the software, the stack information obtaining unit 101 obtains an identifier (such as a system call number 205) of the specific event and process stack information 202, and then records the identifier (such as the system call number 205) of the specific event and the process stack information 202 on the model recording device 300 collectively as an operation model of the software 200. The stack information obtaining unit 101 transmits the identifier (such as the system call number 205) of the specific event and the process stack information 202 to the stack difference information generating unit 102. Incidentally, it is not always necessary to record the identifier of the specific event or the stack information as the operation model.

Here, the system call 201 is an example of the specific events to be obtained by the stack information obtaining unit 101. In addition to the system call, the specific events include a "jmp" command, a "branch" command, an event of processor exception, and so forth. The system call is a command for executing an important process for the system, and therefore constitutes an important monitoring point. In the first embodiment, all system calls are deemed to be the specific events. Here, it is also possible to select the system calls for monitoring in accordance with characteristics of the software and the like. For instance, in a case of the software for carrying out "execve" (to start a process), there is a risk that "execve" is issued cleverly by an attacker, who is aware of vulnerability of this software, to launch "/bin/sh". Hence, it is also possible to select "execve" as the system call for monitoring. Meanwhile, "write" is a system call for writing in a file. Here, a malicious attacker cleverly issues "write" to falsify a file. Accordingly, it is also possible to select "write" as the system call for monitoring. To monitor with limited computational resources, it is effective to select and monitor only extremely important monitoring points such as "execve" or "write".

The stack information 202 is a set of return addresses loaded on a process call stack in the form of the function calls at the time when the system call occurs. This information can identify the loading order on the stack. By using a debug tool (such as "ptrace" in Linux), it is made possible to stop the software every time when the system call occurs, and to check a register value at this point. For example, by checking the resister values where a stack pointer and a stack base pointer are stored, it is made possible to obtain the addresses indicated by the respective pointers. The return address is loaded on an address immediately following the stack base pointer. Accordingly, the process stack information 202 can be obtained by picking up that value.

Figure 2:
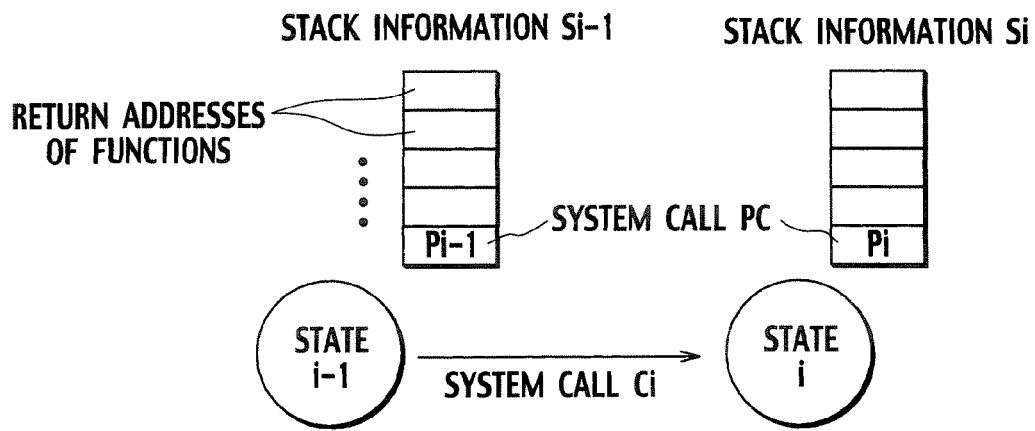
FIG. 2 is a conceptual diagram for explaining stack information according to the first embodiment.

FIG. 2 is a conceptual diagram showing the stack information obtaining unit 101 for obtaining the stack information and the system call. In the example of the stack shown in FIG. 2, the addresses are assumed to be stacked in a subordinate direction. When i represents a natural number, a system call $C_i$ is issued at the time of transition from a state i−1 to a state i. At this point, stack information $S_i$ is obtained, and a program counter value $P_i$ at the time when the system call is issued is added to the lowest position of the stack information $S_i$. The stack information obtaining unit 101 obtains an identifier for identifying the system call $C_i$ and the stack information $S_i$ in the above-mentioned structure, for example.

Figure 3:
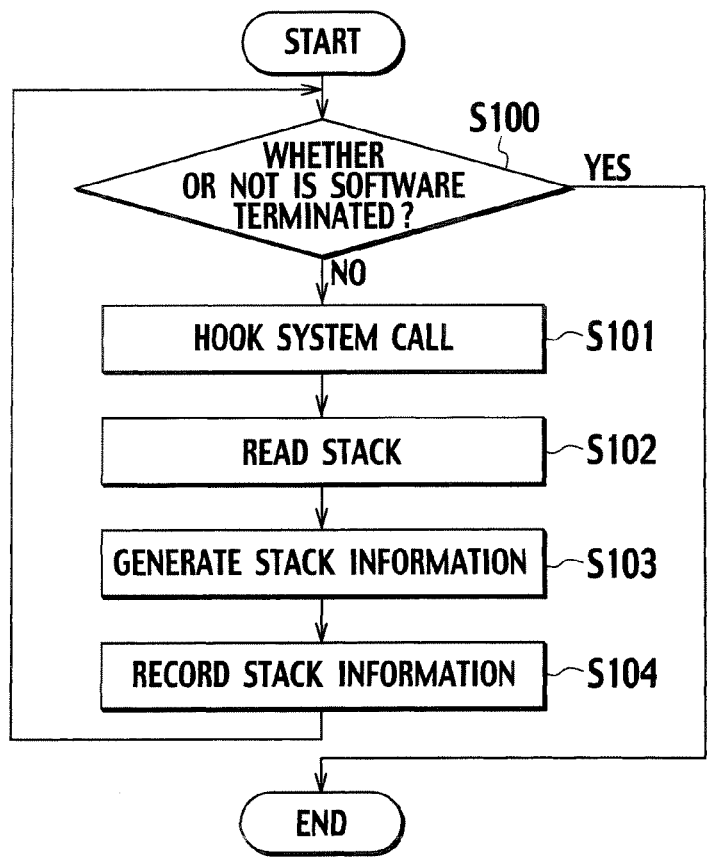
FIG. 3 is a flowchart showing operations of a stack information obtaining unit according to the first embodiment.

FIG. 3 is a flowchart showing an example of operations of the stack information obtaining unit 101.

After a determination on termination of the software which is monitored (Step S100), the stack information obtaining unit 101 hooks the system call issued by the software when the software is not terminated (Step S101). It is possible to use "ptrace" or the like for hooking. When the system call is hooked, the stack information obtaining unit 101 reads the stack information (Step S102), generates the stack information (Step S103), and records the stack information (Step S104).

In a case where a determination is made in Step S100 that the software is terminated, the operation of the stack information obtaining unit 101 is terminated. An example of the stack information obtained here is shown in FIG. 4. System call numbers are recorded in order of issuance thereof on a left column in FIG. 4. Stack information corresponding to the system call numbers is recorded on a right column in FIG. 4. Specifically, a system call No. 122 is initially issued. At this point, return addresses are loaded on the stack in the order of 0x80000001, 0x80000123, and 0x80000345 from the bottom of the stack (that is, the address 0x80000345 is executed first). Next, a system call No. 4 is issued. At this point, return addresses are loaded on the stack in the order of 0x80000001, 0x80000456, and 0x80000567 from the bottom of the stack. Then, another system call No. 4 is issued. At this point, return addresses are loaded on the stack in the order of 0x80000001, 0x80000321, and 0x80000654 from the bottom of the stack. Similarly, the stack information will be recorded every time a system call is issued.

The stack difference information generating unit 102 obtains the stack information 202, and records stack difference information 203 on the model recording device 300 as the operation model of the software 200. The stack difference information generating unit 102 transmits the system call numbers 205 and the stack information 202 to the model generating unit 103. Incidentally, it is not always necessary to record the stack difference information as the operation model.

Here, the stack difference information 203 is the information representing a difference between a piece of stack information 202 currently received and a piece of stack information 202 previously received. FIG. 5 is a conceptual diagram showing the stack difference information 203. Representing i as a natural number, the stack difference information generating unit 102 uses stack information pieces Si−1 and stack information pieces Si (which are identical to those shown in FIG. 2), and compares the respective pieces for finding differences. Specifically, the stack difference information generating unit 102 performs comparison sequentially from the tops of the respective stacks. When the stack difference information generating unit 102 reaches a point where the values are not equal to each other (which is the third track from the top in the example shown in FIG. 5), the stack difference information generating unit 102 extracts the information located below the above-described point as the difference information. The stack difference information Di is equivalent to the information formed by arranging part of the stack information pieces Si−1 from the bottom to where "2" is situated, and by arranging part of the stack information pieces Si from the point where "3" is situated to the bottom in this order. The information from the bottom to the point of "2" of the stack information pieces Si−1 is equivalent to a sequence of functions returned in a period from a state i−1 to a state i. Meanwhile, the information from the point of "3" to the bottom of the stack information pieces Si is equivalent to a sequence of functions called in the period from the state i−1 to the state i. In other words, the stack difference information Di is equivalent to the information for estimating the order of returns and calls occurred before the system call Ci is issued. In software operation monitoring, a method where only the occurrence of the system calls is added to the model allegedly has vulnerability to mimicry attacks. To solve such problem with vulnerability, there are many proposals for adding function calls and returns to the model. In comparison with the system call, the function call and return are respectively commands perceived, by an operating system (OS), to be at the same level as that of other instructions (such as "mov" or "jmp"). Accordingly, the only choice is to carry out stepped execution of the software in order to obtain the function calls and returns accurately. However, the stepped execution is considerable overhead for a software execution speed, and is therefore not practical for a computing machine having a small computational capacity such as a cellular telephone. On the other hand, the stack difference information is the information which is obtainable at the time of occurrence of the system call. Thus, when the software is executed, the software only needs to be stopped at the time of occurrence of the system call. Such an operation can by far reduce the overhead for the software execution speed as compared to the stepped execution.

FIG. 6 is a flowchart showing an example of operations of the stack difference information generating unit 102. After a determination on completion of the stack information (Step S200), the stack difference information generating unit 102 sequentially reads the stack information (Step S201), compares the differences between the previous stack information and the current stack information (Step S202), generates the stack difference information (Step S203), and records the stack difference information (Step S240) when the stack information is not completed.

When a determination is made in Step S200 that the stack information is completed, the operation of the stack difference information generating unit 102 is terminated. FIG. 7 is a view showing an example of the stack difference information and the system call numbers generated by the stack difference information generating unit 102 in a case where the stack information shown in FIG. 4 is inputted to the stack difference information generating unit 102. The information pieces on the first row and the second row shown in FIG. 4 are read out (Step S201 in FIG. 6), and the differences thereof are compared with each other (Step S202 in FIG. 6). The comparison is sequentially performed from the bottom of the stack (that is, from the left side in FIG. 4). As a consequence, it is apparent that 0x80000345 on the first row in the third column, 0x80000456 on the second row in the third column, and the 0x80000567 on the second row in the fourth column are different from one another. When generating the stack difference information (Step S203 in FIG. 6), the previous stack information pieces are extracted after the pieces from the top of the stack (that is, from the right side in FIG. 4) to the row where there is no change are sorted in that order (only 0x80000345 is extracted in the case of the first row in FIG. 4), and then are recorded (Step S204 in FIG. 6). The current stack information pieces are extracted from the point where the change first occurs when the pieces are processed from the bottom of the stack, to the top of the stack in that order (0x80000456 and 0x80000567 are extracted in the case of the second row in FIG. 4), and then are recorded. At the time of this recording operation, the current system call number (which is 4 in the case of the second row in FIG. 4) is concurrently recorded. As a result, the stack difference information is generated as shown on the second row in FIG. 7. Thereafter, the stack difference information is generated from the second row and the third row in FIG. 4 as represented on the third row in FIG. 7.

The model generating unit 103 receives the stack difference information 203, and records correlationship information 206 on the model recording device 300 as an operation model 204 of the software 200.

Here, the correlationship information 206 is the information representing a co-occurrence relationship between the system call number 205 and the stack difference information 203. For example, the correlationship information 206 may be N-gram or a correlationship rule. In a case of grasping the co-occurrence relationship by use of the N-gram, it is possible to use an algorithm disclosed in Makoto Nagao, "A New Method of N-gram Statistics for Large Number of n and Automatic Extraction of Words and Phrases from Large Text Data of Japanese," In proceedings of the 15th International Conference on Computational Linguistics (1994) pp. 611-615, for example.

In descriptions for the first embodiment, it is supposed that a correlationship rule is generated as the correlationship information 206. The correlationship rule is a rule which is applicable to an entire transaction set, and which is defined by obtaining an occurrence probability P (i.e. a conditioned probability) of a certain item B at the time of occurrence of an item set A out of the transaction set. Here, the item set A is termed as a precedent, the item B: a result; and the occurrence probability P; reliability. In the first embodiment, the precedent is extracted from the stack difference information 203, and the correlationship rule is generated by using the system call number 205 as the result.

As described previously, FIG. 7 shows the example of the stack difference information 203. The left column in FIG. 7 represents the system call numbers while the right columns represent the stack difference information corresponding to the system call numbers. When focusing on the second row and the third row having the same system call number 4, 0x80000567 exists in both of the rows as the stack difference information. Accordingly, the reliability is equal to 100% in a case where 0x80000567 is the precedent, and where 4 is the result. In this case, as shown in FIG. 8, a description "0x80000567->4 100%" is recorded on a list of the correlationship rules. Similarly, the combination of 0x80000567 and 0x80000456 exists in both of the rows as the stack difference information. Accordingly, the reliability is equal to 100% in a case where the combination of 0x80000567 and 0x80000456 is the precedent, and where 4 is the result. Hence, a description "0x80000567, 0x80000456->4 100%" is recorded on the list of the correlationship rules. The precedent is the combination of the return addresses on the stack difference information and an extremely large amount of processing is needed for deriving the reliability each for all of the combinations of numbers. However, it is possible to obtain the correlationship rules efficiently by use of a correlationship rule derivation algorithm such as Apriori or FP-Growth.

In order to accelerate computation, the FP-Growth utilizes an FP-Tree algorithm configured to initially read a database, and to retain, in a main memory, a degree of support of an item set needed for later computation.

Details of the FP-Tree algorithm are disclosed in Han et al., Mining frequent patterns without candidate generation," In proceedings of SIGMOD International Conference on Management of Data, pp. 1-12, ACM, 2000, for example. Here, the concept thereof will be described. An FP-Tree is equivalent to tree structure data consisting only of frequent items. To construct the FP-Tree with the database, the frequent items are first extracted. The database is scanned once, and the extracted frequent items are sorted in descending order of the frequency based on values of the degree of support to generate a list (such a list will be hereinafter referred to as an F-list). Then, a root of a tree having a null label is formed (such a tree will be hereinafter referred to as a tree T).

A second scanning is executed for constructing the FP-Tree structure by use of the frequent items and the root node thus obtained. To be more precise, the FP-Tree structure is constructed in accordance with the following procedures.

A current node is previously set to be the root node.

(1) For each of the transactions, the frequent items are extracted and sorted in accordance with the F-list (such a list will be referred to as an item list). The tree T is built up by use of this item list.

(2) The items are sequentially taken out of the item list. When the "current node" on the tree T has a child which is identical to a corresponding one of the taken items, a count for the child is incremented by one, and the current node is transferred to the child. When the current node does not have such a child, a new child having a count equal to 1 is formed, and the current node is transferred to that child.

(3) The operation explained in (2) is repeated up to the last factor on the item list. When the operation for the last factor is completed, the target transaction is changed. The operation explained in (1) is executed until the processing is completed for all of the transactions.

(4) When the processing is completed for all of the transactions, the nodes having the same name are linked together. Moreover, a header table indicating ai on the top is formed for each of the frequent items ai.

Figure 9:
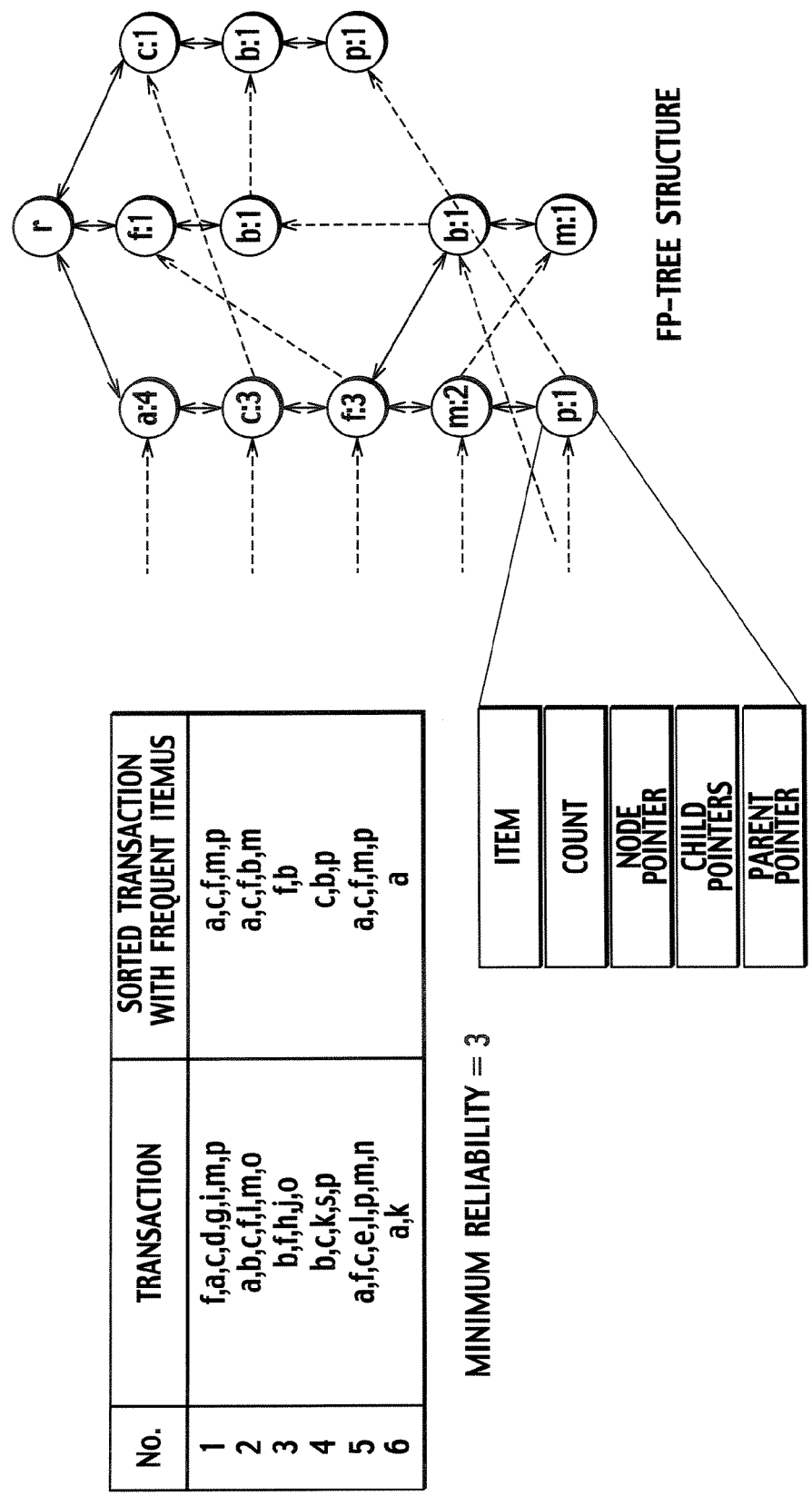
FIG. 9 is a view showing examples respectively of an F-List structure and an FP-Tree structure according to the first embodiment and a second embodiment of the present invention.

A frequent pattern is subjected to mining by use of the FP-Tree constructed by executing the above-described operations. An example of construction of the FP-Tree is shown in FIG. 9.

Here, the model generating unit 103 constructs the FP-Tree in which leaf nodes having values equivalent to system call identifiers is added, and generates this FP-Tree as the operation model of the program. Since the frequency of the item is marked on each node, it is made possible to calculate the degree of support and of reliability easily. The generated model is recorded together with a program identifier and the F-list.

By constructing the model as described above, it is made possible to summarize the identical precedents, and thereby to generate the efficient model.

The above-described method is configured to generate the tree structure by applying the FP-Tree algorithm. However, it suffices that the frequent items be located close to the root side. Thus, it is also possible to apply other algorithms.

The above-described example of the method is configured to utilize all of the return addresses on the stack difference information as the precedents. However, all of the return addresses need not be used in consideration of software execution environment and other factors. For example, in a case where a processor having a small processing capacity is used for modeling, it is possible to reduce costs for generating the model by extracting only N pieces of the return addresses immediately before issuance of the system call. Alternatively, it is also conceivable that N values be changed depending on the type of the system calls. In a case of Linux Kernel 2.4 or higher, for example, the last return address out of the return addresses on the stack difference information is based on a wrapper function for executing the system call. Consequently, the last return address has a very strong co-occurrence relationship with the system call. There is a risk of generating an extremely biased model when the correlationship rule is generated in a state where this return address is included. In other words, there is a risk of extracting only the relationship between the wrapper function and the system call as the model. Accordingly, it is conceivable that the last return address be removed when the correlationship rule is generated. It is also conceivable that a case where a return address is located in a certain address space (such as a space where a library is loaded) be extracted.

Figure 10:
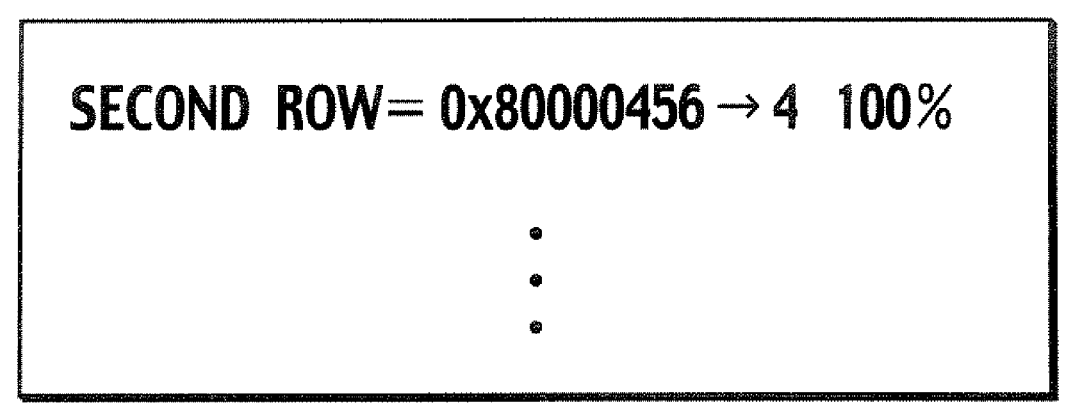

Note that the above-described correlationship rule is derived by use of the Apriori, the FP-Growth or the like. Order information on the function call order is not taken into account when such an algorithm is used. However, it is also possible to include the function call order in the precedents. For example, when focusing on the second row and the third row of the stack difference information shown in FIG. 7, 0x80000456 in the second column from the left side shows the same value, and both of the rows have the same system call number 4. Accordingly, it is possible to generate a rule expressed as "second column=0x80000456->4 100%" (see FIG. 10). By considering the order as described above, it is made possible to incorporate more detailed information as the model.

In the first embodiment, the correlationship rules shown in FIG. 8 are collectively recorded, on the model recording device 300, as the operation model of the software.

Figure 11:
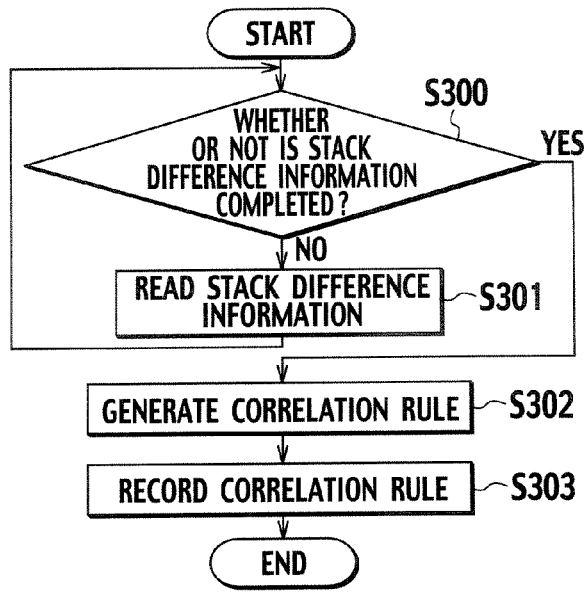
FIG. 11 is a flowchart showing operations of a model generating unit according to the first embodiment.

FIG. 11 is a flowchart showing an example of operations of the model generating unit 103. The co-relationship rules are generated in the first embodiment. The model generating unit 103 obtains the stack difference information. After a determination on completion of the stack difference information (Step S300), the model generating unit 103 sequentially reads the stack difference information (Step S301) when the stack difference information is not completed. When a determination is made in Step S300 that the stack difference information is completed, the model generating unit 103 generates the correlationship rules therefrom (Step S302), and records the correlationship rules (Step S303). In Step S302, a set of each piece of stack difference information and the related system call number are regarded as one transaction, and the precedents are extracted from the stack difference information.

Accordingly, the correlationship rules defining the system call numbers as results are respectively generated as shown in FIG. 8.

(Operation and Effects)

According to the software operation modeling device and the software operation modeling method of the first embodiment, it is made possible to obtain or estimate the issuing order of the function calls executed in each of the specific events in the course of executing software, to statistically grasp the co-occurrence relationship between the specific event and the issuing order of the function calls thus obtained or estimated, and to record the grasped co-occurrence relationship as the operation model of the software.

By constructing the software operation modeling device, or by applying the software modeling method as described above, it is made possible to perform monitoring at a detailed level, and to output a statistic amount used for performing a statistic determination on an unlearned operation as the operation model.

In particular, since the correlationship rule can express the co-occurrence relationship in a small data amount, it is made possible to generate an effective model for a lightweight software operation monitoring system. The present invention is effective for a terminal apparatus, such as a cellular telephone, with a limited capacity of its storage device. The program is constructed logically, and the order (or a context) of the function calls is therefore an extremely important factor for modeling the operation of the program. Nevertheless, such an order is not considered for the correlationship rule. Accordingly, the present invention is characterized in that model generating unit is configured to grasp the co-occurrence relationship while considering the function call order. With this configuration, it is made possible to perform more detailed modeling as compared to the correlationship rules in which the above-described order is not taken into account.

A system call command and a trap command are respectively commands executed at the time of requesting a kernel to perform an important process in the system. Such commands are important events when the operations of the program are monitored. In the correlationship rule, it is made possible to output the model capturing characteristics of the respective events subject to monitoring of the operations thereof by generating the correlationship rules which use the specific events (the trap command and the system call) respectively as the results.

The function call order obtaining unit of the software operation modeling device according to the first embodiment includes the stack information obtaining unit configured to obtain the return addresses loaded on the process stack at the time of occurrence of the specific events in a way that the order in which the return addresses are loaded on the stack is clarified, to record the return addresses in the order of occurrence of the specific events, and to define the recorded information as the issuing order of the function calls.

Usually, in an attempt to hook the function calls completely to grasp the order, it is necessary to operate the program in a single step. However, with the above-described configuration, it is only necessary to stop the program at the time of occurrence of the specific events. In a case where the specific event is the system call or the trap command, for example, it is made possible to stop the operation of the program at the time of the specific event, and to grasp a register value at that point by use of a debug tool (such as "ptrace" of Linux). Since the register stores a value of a stack pointer or a base pointer, it is possible to obtain the return addresses by use of the value while understanding the order of loading the return addresses. The order of the return addresses indicates the function call order issued by the process before the occurrence of the specific event. Accordingly, it is possible to estimate the function call order between the specific events by use of this information on the order of the return addresses. The estimation stated herein unit partial grasping of the function call order. When a function termed as A is called between the specific events, and is carried out until the return, the function A is not loaded on the process stack as the information at the time of occurrence of the specific event. Hence, part of the function A is grasped.

Moreover, the function call order obtaining unit of the software operation modeling device according to the first embodiment includes the stack difference information generator configured to generate the difference information, as the issuing order of the function calls, between the i−1th piece of stack information and the ith piece of stack information which are obtained by the stack information obtaining unit, where i represents a natural number.

With this configuration, it is possible to estimate the function call order which includes not only the function calls but also function returns. It is made possible to perform more detailed modeling by including the function returns.

The model generating unit of the software operation modeling device according to the first embodiment may statistically grasp the co-occurrence relationship by partially using the stack information or the difference information.

It is possible to reduce costs for generating the model by using part of the above-described information.

The model generating unit of the software operation modeling device according to the first embodiment may generate the correlationship rule by use of the grasped co-occurrence relationship.

By generating the co-occurrence relationship in this way, it is made possible to achieve acceleration of the processing with limited resources and suppression of memory usage.

By recording the stack information and the stack difference information as the operation model of the software together with the co-occurrence relationship, it is possible to add an operation model which is used in the anti-attack system disclosed in Non-patent Document 1.

The model generating unit of the software operation modeling device according to the first embodiment makes it possible to generate tree structure information in which a tree structure is constructed by locating, close to the root node, a frequent one of function call identifiers registered in the issuing order of the function calls while an identifier for the specific event is used as the leaf node. The model generating unit then records the tree structure information together with information on a frequency order of the function call identifiers registered in the issuing order of the function calls. In this way, it is possible to summarize the identical precedents, and thereby to reduce the size of the model.

Second Embodiment (Software Operation Monitoring Device and Software Operation Monitoring Method)

Figure 12:
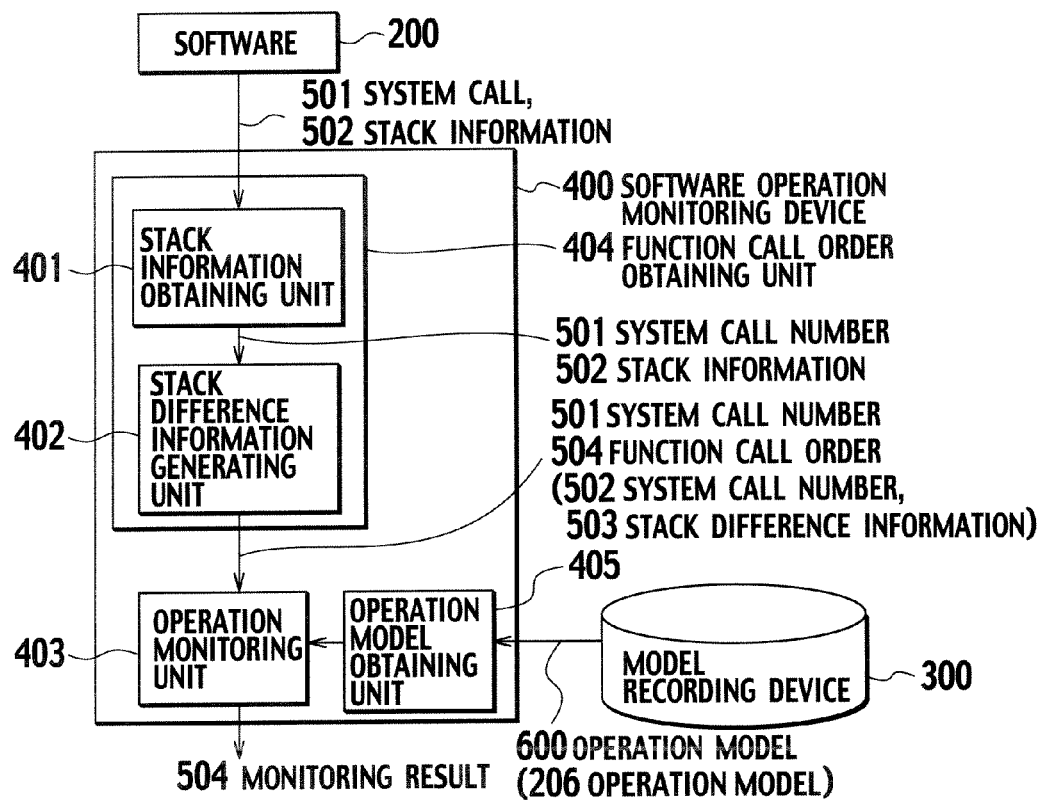
FIG. 12 is a block diagram showing a configuration of a software operation monitoring device according to the second embodiment.

As shown in FIG. 12, a software operation monitoring device 400 according to a second embodiment is connected to a model recording device 300 in which an operation model of software is recorded, and is configured to monitor operations of software 200 and to output a monitoring result 504. The software operation monitoring device 400 includes a function call order obtaining unit 404, an operation model obtaining unit 405 and an operation monitoring unit 403. The function call order obtaining unit 404 grasps an order of function calls executed between specific events (such as system calls) at the time of occurrence of the specific events of the software. The operation model obtaining unit 405 obtains an operation model 600 corresponding to the software 200 from the model recording device 300. The operation monitoring unit 403 receives the operation model obtained by the operation model obtaining unit 405, a system call number 501, and a function call order 504, determines presence or absence of a deviation of the system call number 501 and the function call order 504 from the operation model 600, and outputs a monitoring result 504.

The function call order obtaining unit 404 includes a stack information obtaining unit 401 and a stack difference information generating unit 402. Every time the software 200 issues a system call or the like, the stack information obtaining unit 401 obtains the system call number 501 and stack information 502 at that point, and generates the stack information 502. The stack difference information generating unit 402 receives the system call number 501 and the stack information 502, compares a difference between the previous stack information and the current stack information, and generates stack difference information 503 in which the difference is recorded. Note that the configuration of the function call order obtaining unit 404 shown in FIG. 12 is merely an example, and it is not always necessary to provide the stack information obtaining unit 401. In a case where the stack information obtaining unit 401 is not provided, a program may be operated in a single step, and the function call may be hooked on a function return arbitrarily. With this configuration, it is supposed that the second embodiment employs efficient grasping of the function call order by means of stopping the program at the time of occurrence of the specific events, instead of operating the program in the single step. Here, the stack difference information generating unit 402 is not necessary in a case where the stack information obtaining unit 401 is provided. In a case where the stack difference information generating unit 402 is not provided, the software operation monitoring device 400 functions as a device configured to grasp the function call order by use of process stack information. By providing the stack difference information generating unit 402, it is possible to grasp not only the function calls but also the function call order including function returns, and thereby to perform more detailed operation monitoring. Accordingly, it is supposed that the second embodiment employs this configuration. Moreover, it is supposed that the operation model 600 is correlationship information 206 (such as N-gram or a correlationship rule) indicating a co-occurrence relationship between the system call number and the function call order. This operation model 600 may arbitrarily include the stack information and the stack difference information. By including the stack information and the stack difference information, it is made possible to perform monitoring by means of matching as similar to the method according to Non-patent Document 1. Since the correlationship information 206 is statistic information, there is a risk that a learned operation is determined as an anomaly if this correlationship information is obtained by learning. By performing the matching process as similar to the method disclosed in Non-patent Document 1, it is made possible to eliminate cases of false determination on a leaned operation as an anomaly. Meanwhile, the correlationship information 206 is used for estimating a determination on an unlearned operation.

Figure 13:
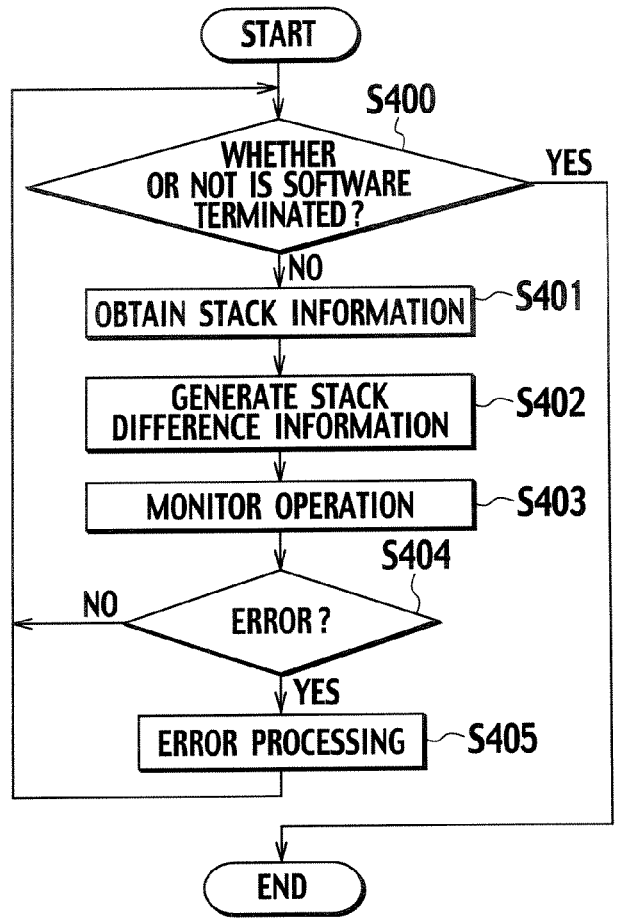
FIG. 13 is a flowchart showing operations of the software operation monitoring device according to the second embodiment.

FIG. 13 is a flowchart showing an example of operations of the software operation monitoring device 400. After a determination on termination of the software (Step S400), the stack information monitoring device 400 obtains the stack information (Step S401), generates the stack difference information (Step S402), and monitors the operation (Step S403) when the software is not terminated. Then, the software operation monitoring device 400 determines the monitoring result (Step S404). In a case where the monitoring result is determined as an error, the software operation monitoring device 400 performs a process corresponding to the error (Step S405), and goes back to Step S400. When the monitoring result is not determined as an error in Step S404, the software operation monitoring device 400 goes back to Step S400. Here, the process corresponding to the error may be termination of the operation of the software or acquisition of a memory dump, for example. However, the type of error is outputted as a standard output, and then the operation of the software is terminated in the second embodiment.

Figure 14:
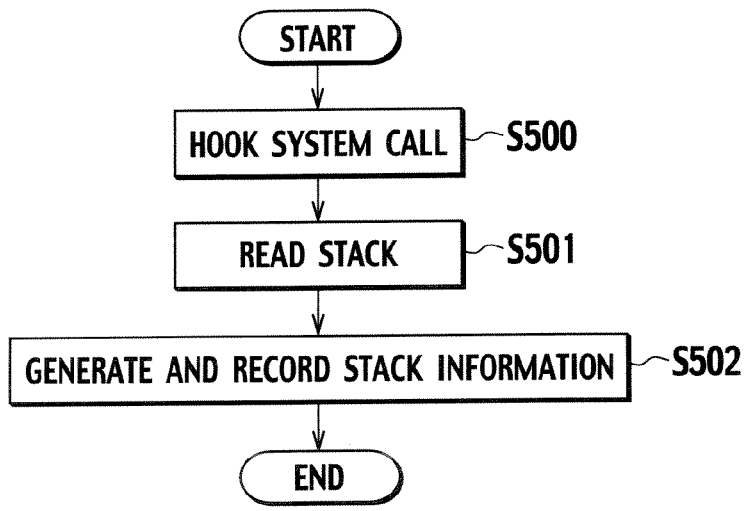
FIG. 14 is a flowchart showing operations of a stack information obtaining unit according to the second embodiment.

FIG. 14 is a flowchart showing an example of operations of the stack information obtaining unit 401. The stack information obtaining unit 401 hooks the system call issued by the software of the monitoring target (Step S500), reads the stack at that point (Step S501), and generates and records the stack information (Step S502). The stack information is a set of return addresses loaded on the process call stack at the occurrence of the system call, and is the information sorted in the order in which the return addresses are loaded on the stack. The Linux has the debug tool called "ptrace". By using this tool, it is made possible to stop the software every time when the system call occurs, and to check a register value at that point. For example, by checking the resister values where a stack pointer and a stack base pointer are stored, it is possible to obtain the addresses indicated by the respective pointers. The return address is loaded on an address immediately following the stack base pointer. Accordingly, the stack information can be obtained by picking up that value.

Figure 15:
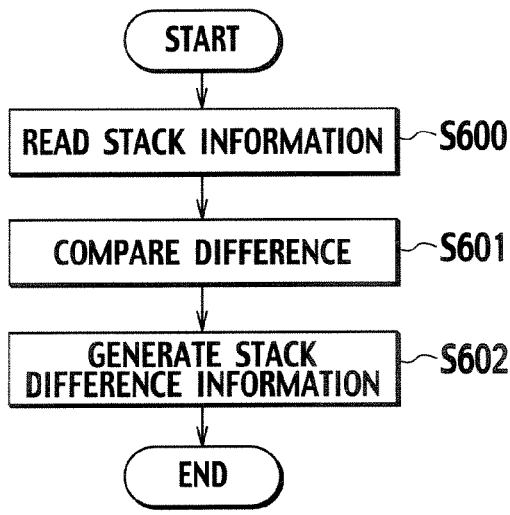
FIG. 15 is a flowchart showing operations of a stack difference information generating unit according to the second embodiment.

FIG. 15 is a flowchart showing an example of operations of the stack difference information generating unit 402. The stack difference information generating unit 402 sequentially reads the stack information (Step S600), compares the differences between the previous stack information and the current stack information (Step S601), and generates the stack difference information (Step S602). FIG. 7 is the view showing the example of the stack difference information and the system call numbers generated by the stack difference information generating unit 402 in a case where the stack information shown in FIG. 4 is inputted to the stack difference information generating unit 402. The information pieces on the first row and the second row shown in FIG. 4 are read out (Step S600) and the differences are compared with each other (Step S601). The comparison is sequentially performed from the bottom of the stack (that is, from the left in FIG. 4). As a consequence, it is apparent that 0x80000345 on the first row in the third column, 0x80000456 on the second row in the third column, and the 0x80000567 on the same row in the fourth column are different from one another. When generating the stack difference information (Step S602), the previous stack information pieces are extracted by sorting the pieces thereof in order from the top of the stack (that is, from the right in FIG. 4) to the row where there is no change (only 0x80000345 is extracted in the case of the first row in FIG. 4), and then are recorded. The current stack information pieces are extracted in order from the first position where the change is first seen when the information pieces are processed from the bottom of the stack, to the top of the stack in that order (0x80000456 and 0x80000567 are extracted in the case of the second row in FIG. 4), and then are recorded. In this recording operation, the current system call number (which is 4 in the case of the second row in FIG. 4) is concurrently recorded. As a result, the stack difference information is generated as shown on the second row in FIG. 7. In a similar manner, the stack difference information is generated from the second row and the third row in FIG. 4 as represented on the third row in FIG. 7.

The operation model obtaining unit 405 statistically grasps the co-occurrence relationship between each of the specific events issued by the software which is monitored and the function call order executed in the specific events, and obtains the operation model indicating the grasped co-occurrence relationship.

Figure 16:
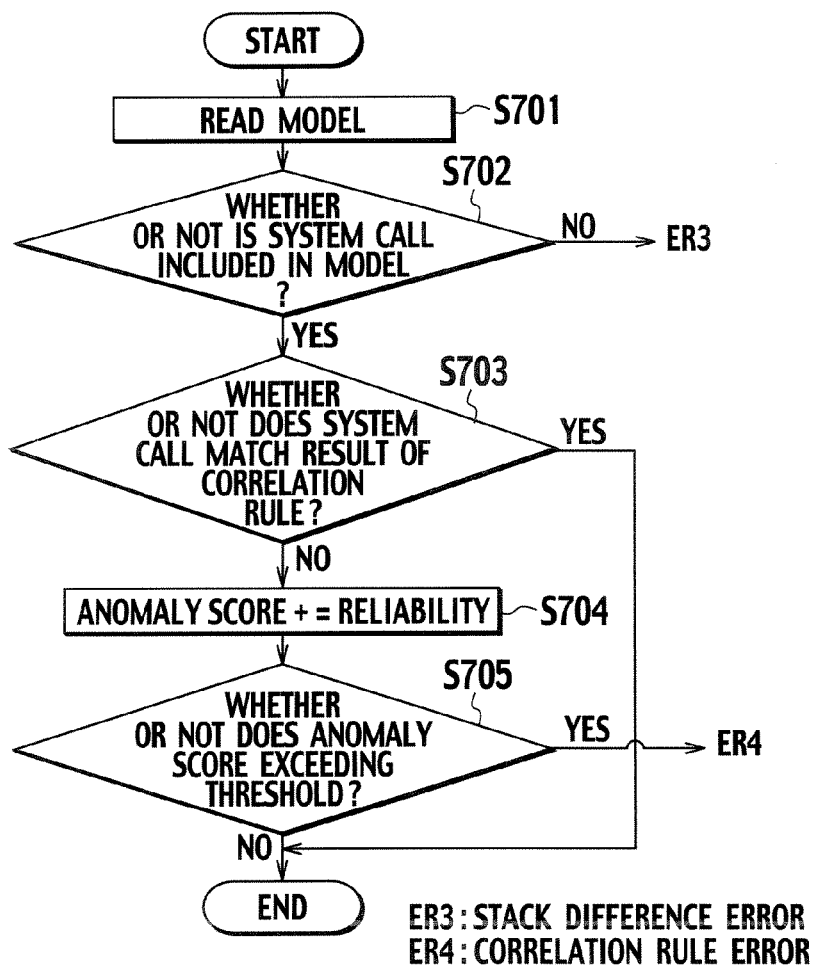
FIG. 16 is a flowchart showing operations of an operation monitoring unit according to the second embodiment.

FIG. 16 is a flowchart showing an example of operations of the operation monitoring unit 403. The operation monitoring unit 403 reads, out of a model record, the operation model which is suitable for the software which is monitored (Step S701). In the second embodiment, it is supposed that the operation model is obtained by extracting a precedent from the stack difference information, and by defining a system call number as a result. Next, the obtained operation model is used for validating whether or not the stack difference information generated by the stack difference information generating unit 402 matches the precedent included in the correlationship rule (Step S702). For example, Step S702 can be achieved by matching all of the combinations of the return addresses on the stack difference information respectively with the precedents in the correlationship rules, for example. When there are no matching cases, ER3 (a stack difference error) is outputted as the monitoring result. When there is a matching case, the next step is executed by use of the matching correlationship rule. Next, a validation is made as to whether or not the system call issued by the software which is monitored matches the result of the correlationship rule which is confirmed to match the precedent (Step S703). In a case where the system call matches the result of the correlationship rule, the process by the operation monitoring unit is completed because a match of each of the precedents with a corresponding one of the results is deemed normal. In a case where a determination is made in Step S703 that the precedent does not match the result, the reliability written in the correlationship rule confirmed to match the precedent is added to an anomaly score (Step S704). Concerning the method of adding the reliability, it is possible to add all of the reliability factors written in the correlationship rules confirmed to match the respective precedents, or to add the reliability written in the correlationship rule having the highest number of the matching return addresses. Alternatively, it is also possible to add an inverse number of a probability of occurrence of a novel event by use of a zero frequency disclosed in Ian H. Witten, et al., "The Zero-Frequency Problem: Estimating the Probabilities of Novel Events in Adaptive Text Compression," IEEE Transactions on Information theory, vol. 37, No. 4, JULY 1991. The zero frequency is configured to estimate a probability of occurrence of the novel event by use of correlationship information obtained at the time of learning, and is based on the concept that the probability of occurrence of the novel event can be approximated by r/n while using the number n of transaction matching a precedent at the time of learning and the number r of the types of results occurring in the precedent thereof. When it is supposed that this probability is included in the operation model, in a case where the system call does not match any one of the precedents and the results at the time of the determinations respectively in Step S702 and Step S703, the inverse number n/r of the probability of occurrence of the novel event is added as the anomaly score. Lastly, a determination is made as to whether or not this anomaly score exceeds a predetermined threshold (Step S705). In a case where the anomaly score exceeds the threshold, ER4 (a correlationship rule error) is outputted as the monitoring result. In a case where the anomaly score does not exceed the threshold, the process by the operation monitoring unit is terminated.

Figure 17:
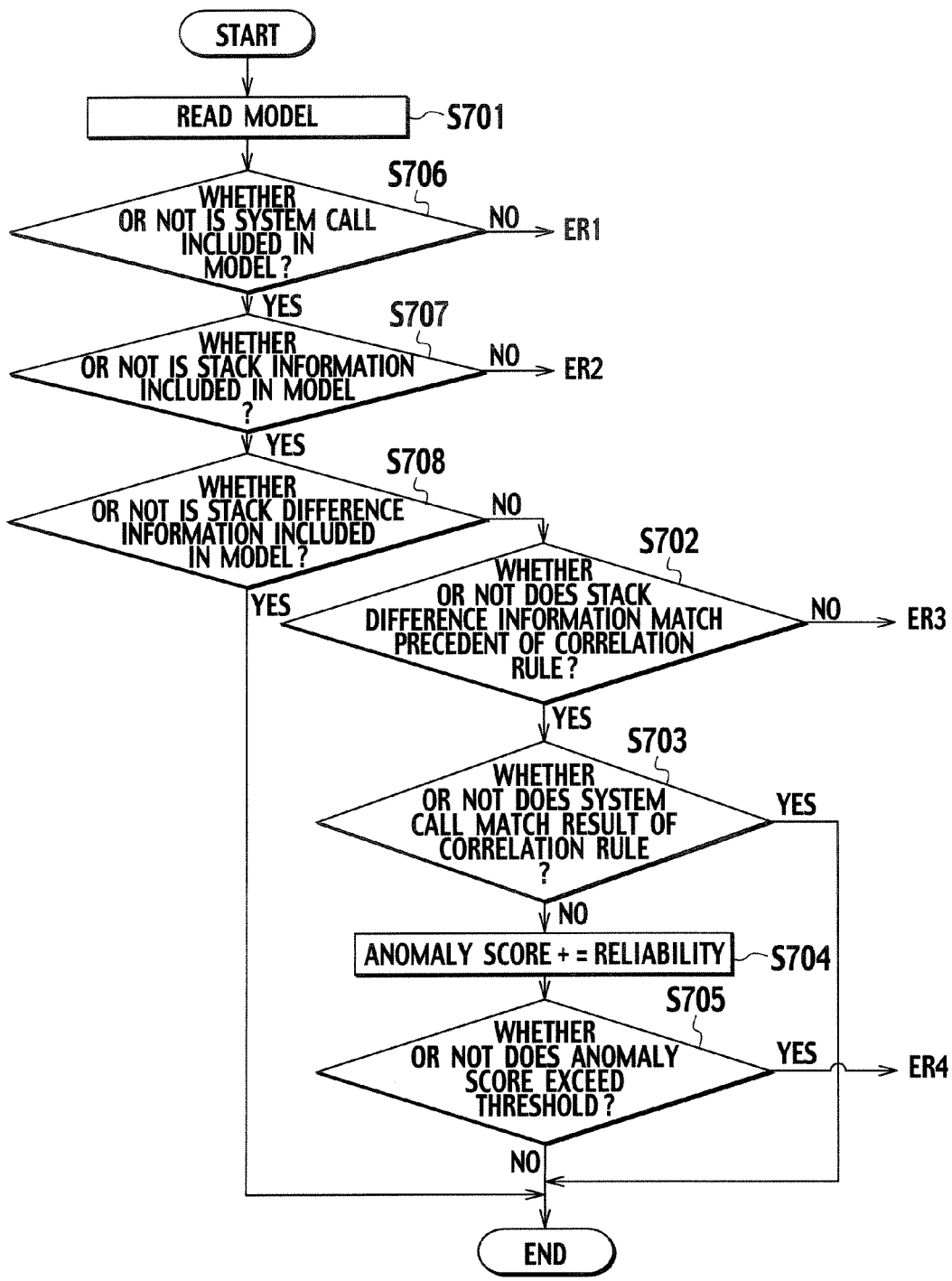
FIG. 17 is another flowchart showing the operations of the operation monitoring unit according to the second embodiment.

FIG. 17 is a flowchart showing another example of the operations of the operation monitoring unit 403. The operation monitoring unit 403 is the monitoring unit utilizing the method according to Non-patent Document 1, and makes it possible to statistically estimate a determination of an unlearned operation while avoiding a determination of a learned operation as an anomaly.

It is supposed that the operation model to be read in Step S701 includes the system call number, the stack information, the stack difference information, and the correlationship information. First, a validation is made as to whether or not the system call issued by the software which is monitored exists in the operation model (Step S703). Since discrimination of the system call by the OS also depends on the number thereof, the validation may be carried out by use of that mechanism. If the system call does not exist, ER1 (a system call error) is outputted as the monitoring result. If the system call exists, a validation is made as to whether or not the stack information, with which the system call discriminated by the number is issued, includes the same information as the stack information at the time of the system call issued by the software which is monitored (the information obtained by the stack information obtaining unit 401) (Step S707). If the applicable information does not exist, ER2 (a stack error) is outputted as the monitoring result. If the applicable information exists, a validation is made as to whether the stack difference information generated by use of the stack information exists in the operation model (Step S708), the stack information being obtained at the time of the system call issued by the software which is monitored (the information generated by the stack difference information generating unit). If the applicable information exists, the software operation is determined as normal, and the process with the operation monitoring unit is completed. If the applicable information does not exist, the Steps S702 to S705 are repeated.

Figure 18:
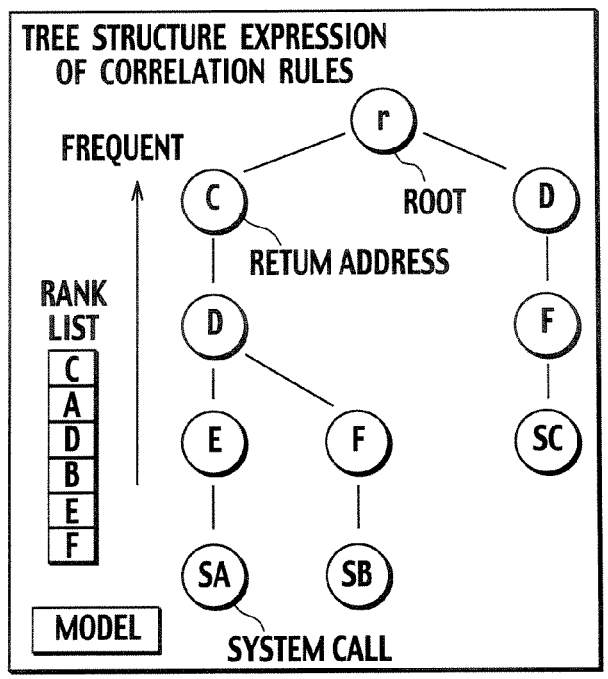
FIG. 18 is a view showing an example of a tree structure of a correlationship rule according to the second embodiment.

When the model is constructed in the FP-Tree structure as shown in FIG. 9, and when there is the F-list, the operation monitoring device may be configured as described below. Here, the tree structure of the correlationship rules is supposed to be expressed as shown in FIG. 18.

Figure 19:
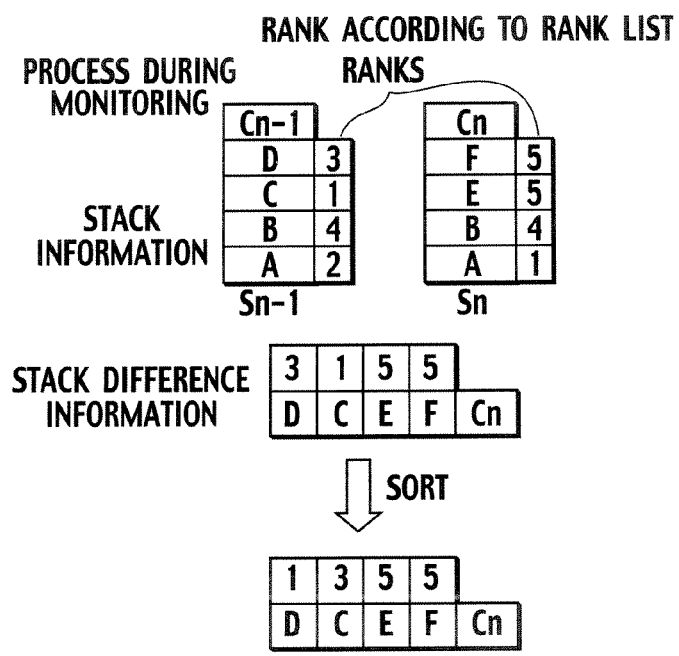
FIG. 19 is a view showing examples of stack information and stack difference information according to the second embodiment.

When obtaining the return addresses loaded on the stack (Step S501 in FIG. 14), the stack information obtaining unit 401 attaches rank information to each of the return addresses in accordance with the F-list (see an upper part of FIG. 19).

After generating the stack difference information, the stack difference information generating unit 402 sorts the return addresses on the stack difference information in ascending order in accordance with the rank information attached to the return addresses (see a lower part of FIG. 19).

Figure 20:
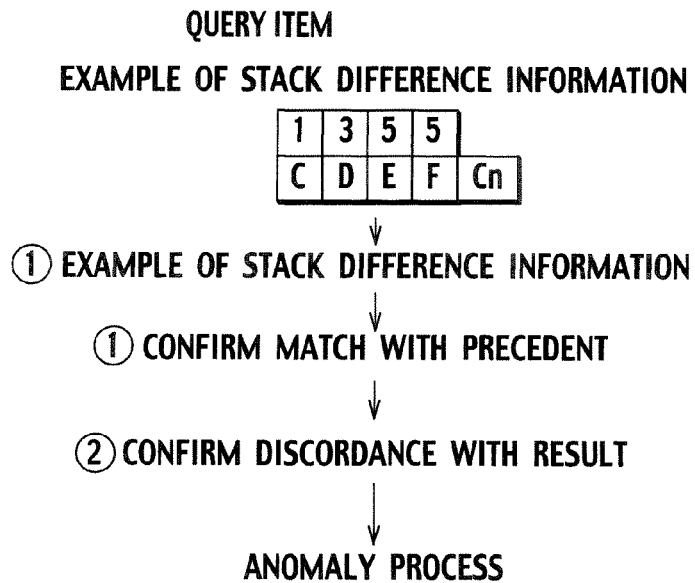
FIG. 20 is a first view for explaining a searching method used in a model constructed as an FP-Tree structure according to the second embodiment.
Figure 21:
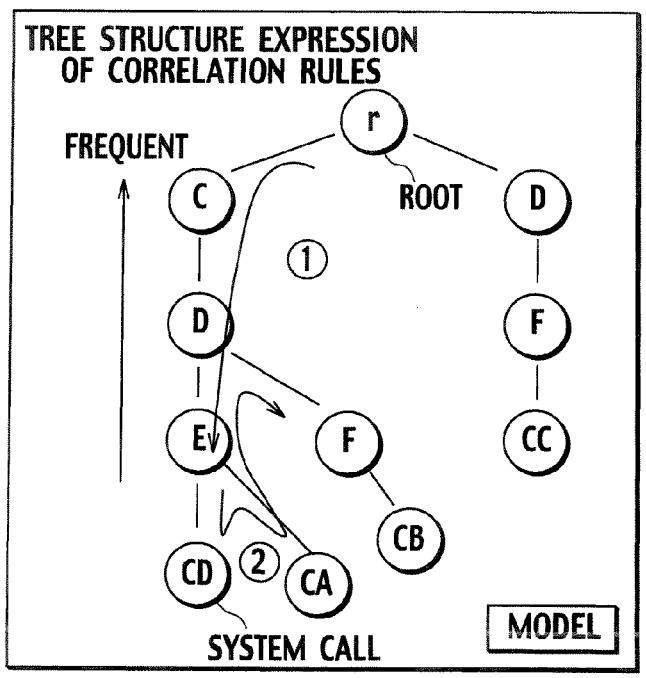
FIG. 21 is a second view for explaining the searching method used in the model constructed as the FP-Tree structure according to the second embodiment.

By use of the stack difference information thus obtained, the operation monitoring unit 403 searches the inside of the model constructed in the form of the FP-Tree structure (Step S702 in FIG. 16). Since the FP-Tree structure is the tree constructed in a way that the frequent items are located close to the root, it is possible to conduct a breadth-first search (see FIG. 20 and FIG. 21) by sorting the stack difference information pieces in accordance with the F-List. Moreover, with the tree structure, it is possible to efficiently search for the system call having the strong co-occurrence relationship with the precedent (the combination of the return addresses in the stack difference information). Since the less frequent items are located close to the leaves of the model, curtailment of the breadth-first search in the mid-course does not cause a large influence to accuracy. In addition, since the frequent items are located close to the root, cache efficiency is improved.

(Operation and Effect)

According to the software operation monitoring device and the software operation monitoring method of the second embodiment, it is made possible to statistically grasp the co-occurrence relationship between each of the specific events issued by the software which is monitored and the issuing order of the function calls executed in the specific events, to obtain the operation model indicating the grasped co-occurrence relationship, to obtain or estimate the issuing order of the function calls executed by the software in the course of executing the software, and to determine the deviation, from the operation model, of the co-occurrence relationship between the specific events and the issuing order of the function calls obtained by the function call order obtaining unit. With this configuration, it is possible to validate the operations of the software statistically. Accordingly, it is made possible to perform validation of unlearned operations, and to reduce the possibility of an false alarm, the validation being unavailable with the anti-attack detection system disclosed in Non-patent Document 1.

The function call order obtaining unit of the software operation monitoring device according to the second embodiment includes the stack information obtaining unit configured to obtain the return addresses loaded on the process stack at the time of occurrence of the specific events in a way that the order in which the return addresses are loaded on the stack, to record the return addresses in the order of occurrence of the specific events, and to define the recorded information as the issuing order of the function calls.

With this configuration, it is made possible to perform validation while stopping the program at the point of occurrence of the specific event. Since it is not necessary to operate the program in the single step, a validation speed is increased.

The function call order obtaining unit of the software operation monitoring device according to the second embodiment includes the stack difference information generator configured to generate, as the issuing order of the function calls, the difference information between the i−1th piece of stack information and the ith piece of stack information which are obtained by the stack information obtaining unit, where i represents a natural number.

With this configuration, it is possible to validate operations of not only the order of the function calls but also of the order of the function returns, under the method of stopping the program at the point of occurrence of the specific event.

The operation model obtained by the operation model obtaining unit of the software operation monitoring device according to the second embodiment may indicate the correlationship rule between the specific event issued by the software which is monitored and the function call order.

Since the correlationship rule can express the co-occurrence relationship in a small data amount, it is made possible to use an effective model for a lightweight software operation monitoring system. The present invention is effective for a terminal apparatus, such as a cellular telephone, with a limited capacity of its storage device. The program is constructed logically, and the order (or a context) of the function calls is therefore an extremely important factor for modeling the operation of the program. Nevertheless, the order of the function calls is not generally taken into account in the correlationship rule. Accordingly, the model generating unit may be configured to grasp the co-occurrence relationship while considering the function call order (such as the order of the return addresses loaded on the process stack). With this configuration, it is made possible to perform more detailed monitoring as compared to the correlationship rules in which the order of the function calls is not considered.

The model obtained by the operation model obtaining unit of the software operation monitoring device according to the second embodiment is that in which the tree structure information and frequency order information of the function call identifiers are recorded. The tree structure information constructs the tree structure by locating, close to a root node, a frequent one of function call identifiers registered in the issuing order of the function calls while an identifier for the specific event is used as a leaf node. The frequency order information is registered in the issuing order of the function calls. Here, the function call order obtaining unit sorts the obtained function call order in accordance with the frequency order information, and the operation monitoring unit searches whether or not the sorted function call order exists in the tree structure information.

Accordingly, it is made possible to efficiently search for the result (such as the system call) having the strong co-occurrence relationship with the precedent. Moreover, since the items located closer to the leaves of the model occur less frequently, curtailment of the search in the mid-course does not cause a large influence to accuracy. In addition, since the more frequent items are located close to the root, cache efficiency is improved.

When monitoring the deviation, from the correlationship rule indicated by the operation model, of the co-occurrence relationship between the function call order and the specific events issued by the software which is monitored, the operation monitoring unit of the software operation monitoring device according to the second embodiment may measure a score in which reliability indicated by the correlationship rule represents a parameter, and may detect a case where the score exceeds a predetermined threshold.

In this event, the reliability is a probability of occurrence of a result associated with occurrence of a precedent, that is, a conditional probability. By using the reliability, it is made possible to find a probability of occurrence of an operation which coincides with a precedent described in a correlationship rule, but which does not coincide with a result described in the rule. Such a probability of discordance may be regarded as a probability of occurrence of an abnormal operation. Accordingly, this probability serves as an effective score for detecting the abnormal operation. With this configuration, it is possible to express the degree of abnormality with a numerical value. By setting an appropriate threshold, it is made possible to provide an anti-attack detection system with suitable detection accuracy for an application scene.

Third Embodiment (Software Operation Monitoring Device and Software Operation Monitoring Method)

Figure 22:
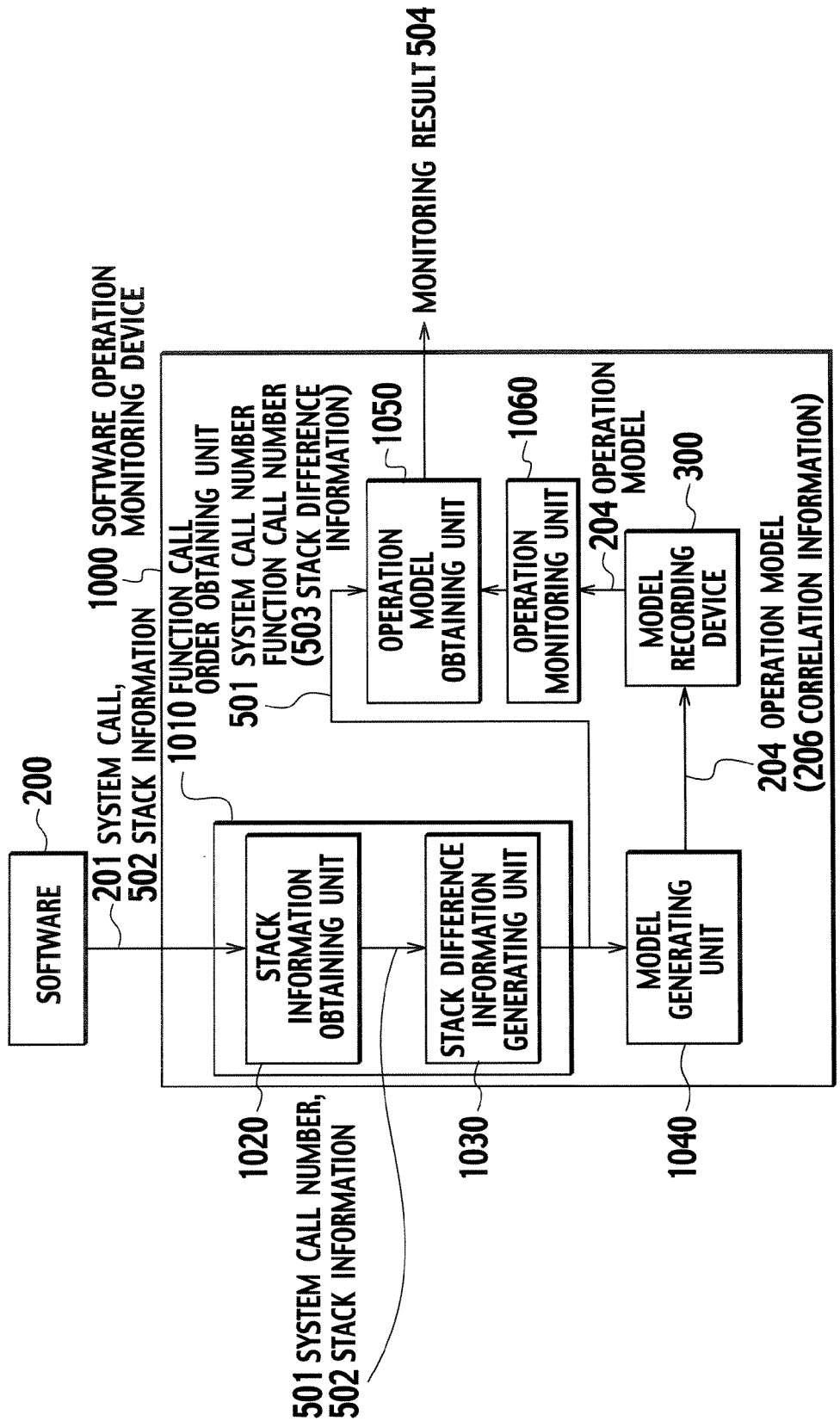
FIG. 22 is a block diagram showing a configuration of a software operation monitoring device according to a third embodiment of the preset invention.

As shown in FIG. 22, a software operation monitoring device 1000 according to a third embodiment includes a model generating unit 1040 in addition to the constituents of the software operation monitoring device 400 of the second embodiment.

The model generating unit 1040 generates a co-occurrence relationship between a function call order and specific events, the co-occurrence relationship being expressed in the form of a statistic amount as an operation model 204 of software.

Explanations for actions of a function call order obtaining unit 1010, an operation monitoring unit 1050, and an operation model obtaining unit 1060, which are similar to those in the second embodiment, will be omitted herein.

A software operation monitoring device 1000 makes it possible to learn operations of software 200, and to divide the operations into a modeling state in which a model is generated, and a monitoring state in which the operations of the software is monitored by use of the model. The function call order obtaining unit 1010 and the model generating unit 1040 are operated in the modeling state. Meanwhile, the function order obtaining unit 1010 and the operation monitoring unit 1050 are operated in the monitoring state. The function call order obtaining unit 1010 also has a modeling state and a monitoring state.

The function call order obtaining unit 1010 includes a stack information generating unit 1020 and a stack difference information generating unit 1030. The stack information generating unit 1020 obtains a specific event identifier (which is a system call number 501 in a case of a system call) and stack information 502 at each time when the software 200 issues the system call or the like, and generates the stack information 502. The stack difference information generating unit 1030 receives the system call number 501 and the stack information 502, compares a difference between the previous stack information and the current stack information, and generates stack difference information 503 in which the difference is recorded. Incidentally, the configuration of the function call order obtaining unit 1010 is merely an example, and it is not necessary to provide the stack information obtaining unit 1020. In a case where the stack information obtaining unit 1020 is not provided, it suffices that a program be provided in a single step, and that the function call be hooked on a function return arbitrarily. With this configuration, it is supposed that the third embodiment adopts efficient grasping of the function call order by means of stopping the program at the time of occurrence of the specific events, instead of operating the program in the single step. Incidentally, the stack difference information generating unit 1030 is not necessary in a case where the stack information obtaining unit 1020 is provided. In a case where the stack difference information generating unit 1030 is not provided, the software operation monitoring device functions as the device configured to grasp the function call order by use of process stack information. It is possible to grasp not only the function calls but also the function call order including function returns, and thereby to perform more detailed operation monitoring by including the stack difference information generating unit 1030 in the configuration. Accordingly, it is supposed that the second embodiment adopts this configuration.

Here, the system call 201 is an example of one of the specific events to be obtained by the stack information obtaining unit 1020. In addition to the system call, the specific events include a "jmp" command, a "branch" command, an event of processor exception, and so forth. The system call is a command for executing an important process for the system, and therefore constitutes an important point to be monitored. In the third embodiment, the system call is deemed to the specific event.

An example of operations of the stack information obtaining unit in the modeling state is similar to the operations described with reference to FIG. 3. Meanwhile, an example of operations of the stack difference information generating unit in the modeling state is similar to the operations described with reference to FIG. 6. An example of operations of the software operation monitoring device in the monitoring state is similar to the operations described with reference to FIG. 13. An example of operations of the stack information obtaining unit in the monitoring state is similar to the operations described with reference to FIG. 14. Meanwhile, an example of operations of the stack difference information generating unit in the monitoring state is similar to the operations described with reference to FIG. 15.

The model generating unit 1040 is executed only in the modeling state. The model generating unit 1040 receives the stack difference information 503, and records correlationship information 206, on a model recording device 300, as the operation model 204 of the software 200.

It is supposed that the operation model 204 is the correlationship information 206 (such as N-gram or a correlationship rule) indicating a co-occurrence relationship between a system call number and the function call order. This operation model 204 may arbitrarily include the stack information and the stack difference information. By including the stack information and the stack difference information, it is possible to perform monitoring by means of matching as similar to the method according to Non-patent Document 1. Since the correlationship information 206 is statistic information, there is a risk that a learned operation is determined as an anomaly if this correlationship information is obtained by learning. By performing the matching process as similar to the method disclosed in Non-patent Document 1, it is made possible to eliminate a determination of a leaned operation as an anomaly. Meanwhile, the correlationship information 206 is used for estimating a determination of an unlearned operation.

An example of operations of the model generating unit is similar to the operations described with reference to FIG. 11.

The operation monitoring unit 1050 is executed only in the monitoring state. The operation monitoring unit 1050 receives the specific events and the function call order, and further receives the operation model 204, which corresponds to the software 200, from the model recording device 300. Then, the operation monitoring unit 1050 determines presence or absence of a deviation, from the operation model 204, of the co-occurrence relationship between the specific events and the function call order, and outputs a monitoring result 504.

An example of operations of the operation monitoring unit is similar to the operations described with reference to FIG. 16 and FIG. 17.

(Operation and Effects)

The software operation monitoring device according to the third embodiment further includes the model generator configured to statistically grasp the co-occurrence relationship between each of the specific events and the issuing order of the function calls obtained or estimated by the function call order obtaining unit, and to record the grasped co-occurrence relationship as the operation model of the software.

Usually, an operation of a program varies depending on an operating environment. Such a variation is attributable to a difference in an OS environment between Linux and Windows®, or to a difference in a central processing unit between IA-32 and ARM, for example. Accordingly, by constructing a device in accordance with the software operation monitoring device of the third embodiment, it is made possible to perform modeling and monitoring in the same operating environment.

What is claimed is:

1. A software operation modeling device implemented by a processor comprising:
    a function call order obtaining unit configured to determine an issuing order of function calls executed in each of specific events in the course of executing software, the specific events each being assigned an identifier, the function call order obtaining unit including a stack information obtaining unit configured to obtain return addresses loaded on a stack at the time of occurrence of the specific event thereby defining an order in which the return addresses are loaded on the stack, to record the return addresses in an order of occurrence of the specific events, and to define the recorded return addresses as the issuing order of the function calls; and a model generator configured to statistically determine a co-occurrence relationship between a specific event and the issuing order of the function calls by determining differences between specific events having the same identifier, and to record the co-occurrence relationship as an operation model of the software.

2. The software operation modeling device according to claim 1, wherein the function call order obtaining unit determines an issuing order of function returns in addition to the issuing order of the function calls.

3. The software operation modeling device according to claim 1, wherein the function call order obtaining unit includes a stack difference information generator configured to generate, as the issuing order of the function calls, difference information between an i−1 th piece of stack information and an ith piece of stack information obtained by the stack information obtaining unit, where i represents a positive number.

4. The software operation modeling device according to claim 1, wherein the model generator statistically determines the co-occurrence relationship by partially using any one of the stack information and the difference information.

5. The software operation modeling device according to claim 1, wherein the model generator generates a correlationship rule using the co-occurrence relationship.

6. The software operation modeling device according to claim 5, wherein the model generator generates the correlationship rule by generating tree structure information, in which a tree structure is constructed by locating, close to a root node, a frequent one of function call identifiers registered in the issuing order of the function calls while an identifier for the specific event is used as a leaf node, and by recording the tree structure information together with frequency order information of the function call identifiers registered in the issuing order of the function calls.

7. The software operation modeling device according to claim 1, wherein the specific event is a system call.

8. A software operation modeling method implemented by software operation modeling device implemented by a processor, comprising:

determining an issuing order of function calls executed in each of specific events in the course of executing software, the specific events each being assigned an identifier;

obtaining return addresses loaded on a stack at the time of occurrence of the specific events thereby defining an order in which the return addresses are loaded on the stack;

recording the return addresses in an order of occurrence of the specific events:

defining the recorded return addresses as the issuing order of the function calls:

statistically determining a co-occurrence relationship between the specific event and the issuing order of the function calls by determining differences between specific events having the same identifier; and recording the co-occurrence relationship as an operation model of the software.

9. A software operation monitoring device comprising:

an operation model obtaining unit implemented by a processor and configured to statistically determine a co-occurrence relationship between each of specific events each having an assigned identifier and an issuing order of function calls executed in the specific events by determining differences between specific events having the same identifier, the specific events being issued by software which is monitored, and to obtain an operation model indicating the co-occurrence relationship;

a function call order obtaining unit configured to determine the issuing order of the function calls executed by the software in the course of executing the software, the function call order obtaining unit including a stack information obtaining unit configured to obtain return addresses loaded on a stack at the time of occurrence of the specific events thereby defining an order in which the return addresses are loaded on the stack, to record the return addresses in order of occurrence of the specific events, and to define the recorded return addresses as the issuing order of the function calls; and an operation monitor configured to determine a deviation, from the operation model, of the co-occurrence relationship between the specific events and the issuing order of the function calls.

10. The software operation monitoring device according to claim 9, wherein the function call order obtaining unit includes a stack difference information generator configured to generate, as the issuing order of the function calls, difference information between an i−1 th piece of stack information and an ith piece of the stack information obtained by the stack information obtaining unit, where i represents a positive number.

11. The software operation monitoring device according to claim 9, wherein the operation model indicates a correlationship rule between the specific events issued by the software which is monitored and a function call order.

12. The software operation monitoring device according to claim 11, wherein the operation model is that in which tree structure information is recorded, a tree structure being constructed in the tree structure information by locating, close to a root node, a frequent one of function call identifiers registered in the issuing order of the function calls while an identifier for a specific event is used as a leaf node, and in which frequency order information of the function call identifiers registered in the issuing order of the function calls is recorded, the function call order obtaining unit sorts the obtained function call order in accordance with the frequency order information, and the operation monitor searches whether a sorted function call order exists in the tree structure information.

13. The software operation monitoring device according to claim 9, wherein, when monitoring the deviation, from the correlationship rule indicated by the operation model, of the co-occurrence relationship between the function call order and a specific event issued by the software which is monitored, the operation monitor measures a score in which reliability indicated by the correlationship rule is set to be a parameter, and detects when the score exceeds a predetermined threshold.

14. The software operation monitoring device according to claim 9, wherein the specific event is a system call.

15. The software operation monitoring device according to claim 9, further comprising:

a model generator configured to statistically determine the co-occurrence relationship between a specific event and the issuing order of the function calls, and to record the co-occurrence relationship as the operation model of the software.

16. A software operation monitoring method implemented on a software operation monitoring device, comprising:

statistically determining, via a processor of the software operation monitoring device, a co-occurrence relationship between each of specific events each having an assigned identifier and an issuing order of function calls executed in the specific events by determining the difference between specific events having the same identifier, the specific events being issued by software which is monitored;

obtaining an operation model indicating the co-occurrence relationship;

determining the issuing order of the function calls executed by the software in the course of executing the software;

obtaining return addresses loaded on a stack at the time of occurrence of the specific events thereby defining an order in which the return addresses are loaded on the stack;

recording the return addresses in order of occurrence of the specific events;

defining the recorded return addresses as the issuing order of the function calls; and determining a deviation, from the operation model, of the co-occurrence relationship between the specific events and the issuing order of the function calls.

* * * * *